United States Patent [19]

DeVries et al.

[11] Patent Number: 4,675,865
[45] Date of Patent: Jun. 23, 1987

[54] BUS INTERFACE

[75] Inventors: Paul A. DeVries, Wayne; Brian R. Smith, Ann Arbor, both of Mich.; Jay S. Parker, Portland, Oreg.

[73] Assignee: Northern Telecom Limited, Montreal, Canada

[21] Appl. No.: 784,315

[22] Filed: Oct. 4, 1985

[51] Int. Cl.$^4$ .............................................. H04J 3/02
[52] U.S. Cl. ...................................................... 370/85
[58] Field of Search ............................ 370/58, 85, 94

[56] References Cited

U.S. PATENT DOCUMENTS

| 4,451,881 | 5/1984 | Grice et al. | 370/85 |
| 4,453,229 | 6/1984 | Schaire | 364/900 |
| 4,597,074 | 6/1986 | Demichelis et al. | 370/58 |

Primary Examiner—Douglas W. Olms
Assistant Examiner—Kenneth I. Rokoff
Attorney, Agent, or Firm—Schwartz, Jeffery, Schwaab, Mack, Blumenthal & Evans

[57] ABSTRACT

A bus interface for interfacing between a processor and a shared bus is disclosed. The bus interface allows the exchange of data in the form of packets between the bus and the processor. An interface control device exchanges control data with the shared bus (e.g. identification signals, polling signals, control signals) in order to regulate accesses of the interface circuit to the shared bus. State machines (e.g. a transmitter and a receiver) including data pipelines, are responsive to control signals from the interface control device for exchanging data between the shared bus and a data storage device. An access control device both controls the flow of data between the processor and the data storage device and regulates access to the data storage device between the processor and the state machines.

20 Claims, 13 Drawing Figures

BUS INTERFACE

This invention relates generally to buses in a computer environment and more particularly to a bus interface. It is well known in the computer field to have distributed elements interconnected via buses. These buses include address buses, control buses and data buses. With the use of buses it is of course necessary to interface the various elements and the buses. U.S. Pat. No. 4,451,881 issued May 29, 1984 to D. G. Grice et al and U.S. Pat. No. 4,453,229 issued June 5, 1984 to S. H. Schaire are indicative of bus applications and bus interfacing.

SUMMARY OF THE INVENTION

The present invention is directed to a bus interface or bus tap used to interface a processor or like device to a shared bus. The bus interface handles the protocol of accessing the bus for both transmit and receive directions and thus frees the processor from these chores. The bus interface of the present invention uses pipeline registers to temporarily store the information and to allow the bus interface to always keep up to the bus data rate. Additionally, the bus interface handles and generates all required timing and control signals for access to the processor.

The bus interface stores the data passing through it in storage buffers. The data is transmitted and received by the bus interface in the form of packets. The bus interface can transmit and receive packets at the full data rate of the bus; that is, it functions without generating any bytewise flow control. To provide this capability, the bus interface accesses the buffer memory (comprised of storage buffers) sixteen bits at a time for both read and write operations. It also stores multiple transmit or receive data bytes in pipeline fashion to guarantee maximum data flow on the bus.

The processor can access the buffer memory to load data packets in for later transmission or to readout packets which have been received. It can do so concurrently with the transmission or reception of a packet without causing the bus interface to generate flow control because the bus data bytes go into or out of the buffer memory in word mode (i.e. sixteen bits) through a pipeline. On each access by the processor, to read or write data into the buffer memory, a cyclic redundancy check (CRC) can be performed on the data if that function is enabled by an appropriate input signal.

The processor can access other locations within the bus interface, besides the buffer memory, as different addresses. It can read sixteen bits of status information which is useful for managing the storage buffers. Reading another location gives eleven ID bits which provide some information about the function of the bus interface within the system. The value which has been accumulated in a register in the CRC circuit can also be read. In addition, the processor can write a new value directly into the CRC register.

After the bus interface transmits or receives a packet, it generates an interrupt signal to the processor. The processor can clear the interrupt by performing a write access to one of two addresses, one for each source of the interrupt. In order to transmit a packet correctly the bus interface must have the length of the packet written by the processor into a byte count latch which has its own address. The processor can also reset all the control circuitry in the bus interface to an initial state by a write access to yet another location. The processor can cause the bus interface to change the number of storage buffers which are allocated for transmit and receive by writing a value to a single latch. The processor can also write a three bit value into a register called the "get pointer" register which is used in managing the storage buffers.

Since accesses into the storage buffers can come either from the circuitry which is sending or receiving data on the bus or from the processor, some means is necessary for arbitrating the accesses. An arbitrator grants access to one side or the other, processor or bus, according to a simple rule. The bus side will normally have access into the buffers but when the processor wants an access, it will normally be given priority. However, the processor will not be allowed to have more than one access in a row. All accesses and operations in the bus interface are synchronized to the 2.56 MHz clocks of the bus.

Stated in other terms the present invention is an interface circuit for interfacing between a shared bus and a processor, both for extracting information, in the form of packets, from the bus and for transmitting information, in the form of packets, to the bus, the interface circuit comprising: interface control means for receiving control information from the shared bus and transmitting control information to the shared bus; receiver means, responsive to control signals from the interface control means, for receiving data from the shared bus and for routing the data to a temporary data storage means; transmitter means, responsive to control signals from the interface control means, for transmitting data from the temporary data storage means to the shared bus; and access control means for controlling the flow of data between the processor and the temporary data storage means.

Stated in yet other terms the present invention is an interface circuit for interfacing between a shared bus and a processor both for extracting data, in the form of packets, from the bus and for transmitting data, in the form of packets, to the bus, the interface circuit comprising: interface control means for exchanging control data with the shared bus, in the form of identification signals, polling signals, and control signals in order to regulate accesses of the interface circuit to the shared bus both for the reception of data on the bus, addressed to the interface circuit, and for the transmission of data on the shared bus; receiver means, responsive to control signals from the interface control means, for receiving data from the shared bus and for routing the data to a data storage means for temporary storage; transmitter means, responsive to control signals from the interface control means, for accessing data stored in the storage means and transmitting it to the shared bus; access control means both for controlling the flow of data between the processor and the data storage means, and for regulating access to the data storage means between the processor and the interface circuit.

Stated in still other terms, the present invention is an interface circuit, for interfacing between a shared bus and a processor, for exchanging data in the form of packets between the bus and the processor, the interface circuit comprising: interface control means for exchanging control data with the shared bus in order to regulate accesses of the interface circuit to the shared bus; a state machine means, including a data pipeline, the state machine means responsive to control signals from the interface control means, for exchanging data between the shared bus and a data storage means; access control means both for controlling the flow of data between the processor and the data storage means, and for regulating access to the data storage means between the processor and the state machine means; wherein access to the data storage means alternates between the state machine means and the processor such that the data pipeline in the state machine means accommodates data being exchanged between the data storage means and the shared bus during those times that the processor is accessing the data storage means.

DETAILED DESCRIPTION

Figure 1:
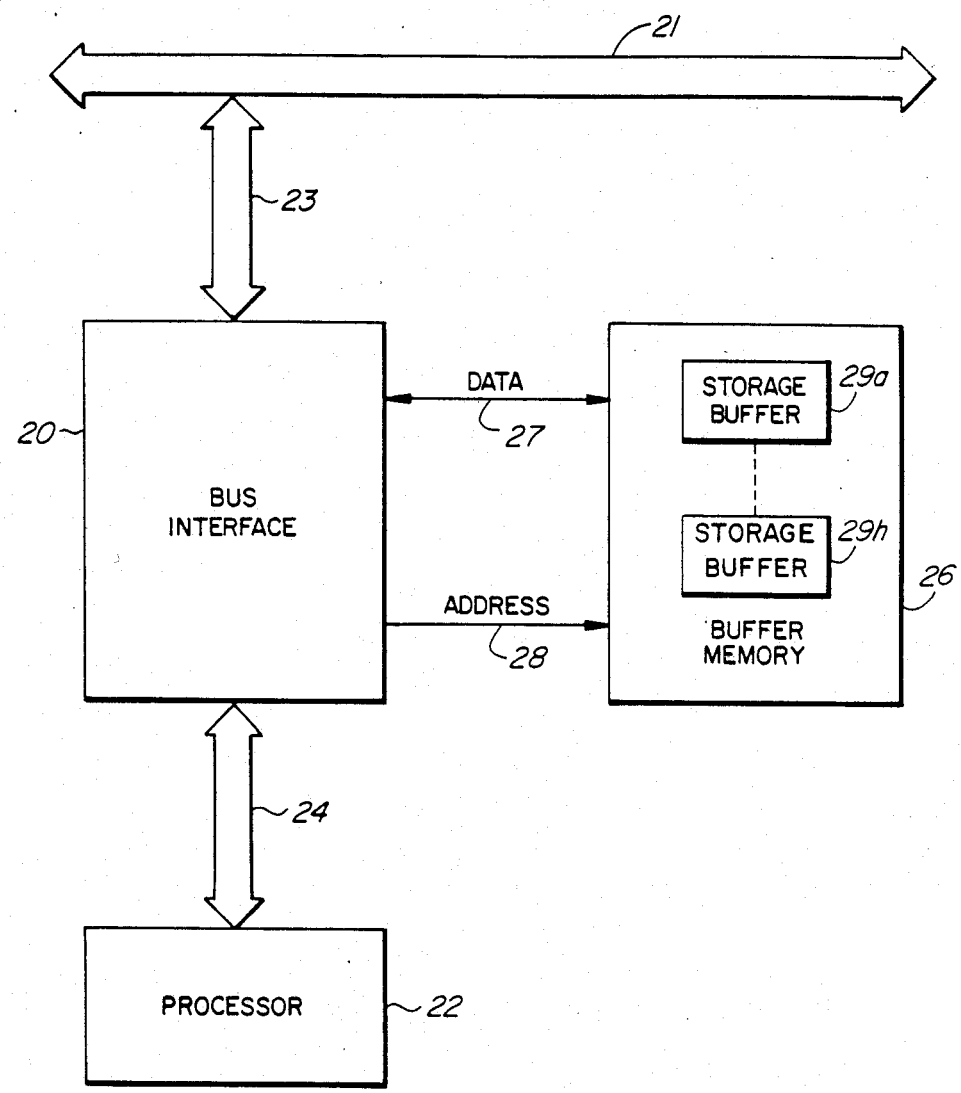
FIG. 1 is a simplified block diagram depicting one application of the bus interface.

FIG. 1 depicts the application of bus interface 20 to interface between bus 21 and processor 22. The access between bus interface 20 and bus 21 is via bus 23 and the access between bus interface 20 and processor 22 is via bus 24. Buffer memory 26 is comprised of RAM (Random Access Memory) and provides temporary storage for data under the control of bus interface 20. Bus interface 20 communicates with buffer memory 26 via data bus 27 and via address bus 28.

Figure 2:
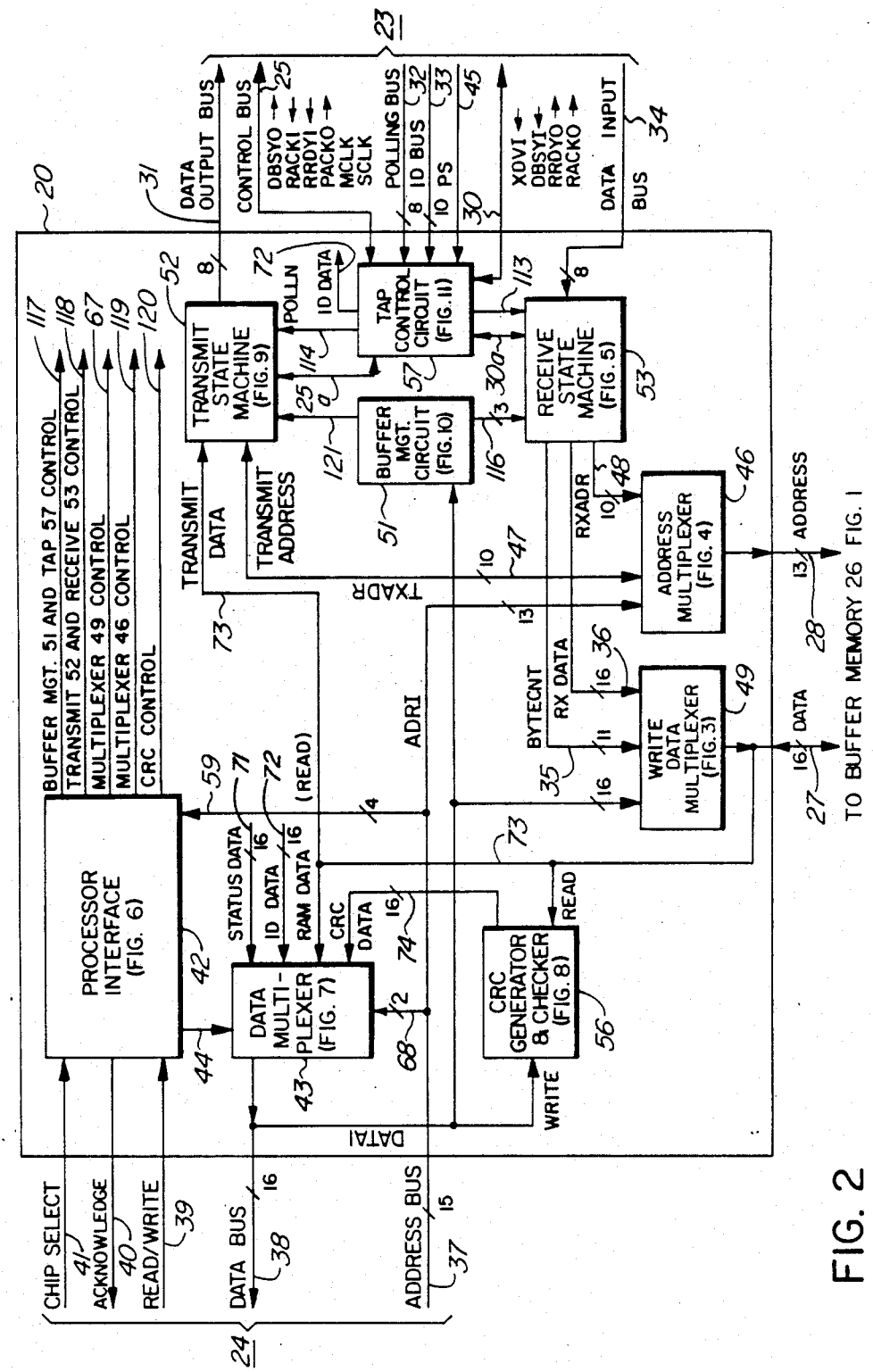
FIG. 2 is a simplified block diagram of the bus interface of FIG. 1.

FIG. 2 depicts bus interface 20 in more detail. As can be seen from FIG. 2, access bus 23 interfacing bus interface 20 and bus 21 (FIG. 1) is comprised of six buses and lead 45. These six buses are data output bus 31, polling bus 32, ID bus 33, data input bus 34, and control buses 25 and 30.

Access bus 24, connecting bus interface 20 and processor 22 (FIG. 1), is comprised of two major buses and several control leads. The two major buses in access bus 24 are address bus 37 and bidirectional data bus 38. The other signals in bus 24 are read/write line 39, acknowledge line 40, and chip select line 41.

Processor interface 42 contains the control circuitry for processor 22 (FIG. 1) accesses into bus interface 20. The signal (CSIN) on chip select line 41 goes low when processor 22 (FIG. 1) addresses the area where the bus interface is located. Note that the chip select signal on line 41 is generated when processor 22 accesses the area of its address space where bus interface 20 resides. Decoding of the address to produce the signal on line 41 is done externally of interface 20. Four address bits (on bus 59) are decoded to indicate which area of bus interface 20 is being accessed.

Figure 12:
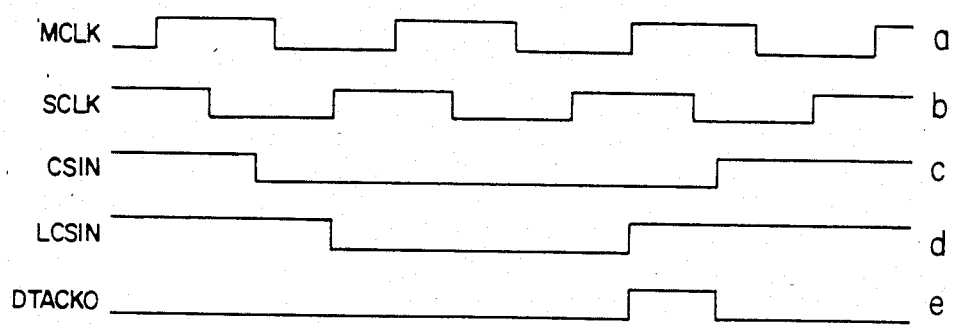
FIGS. 12 and 13 depict some waveforms useful for understanding the operation of the invention.

When the access has been completed the signal DTACKO, on acknowledge line 40, is returned to processor 22. Processor 22 then ends the access, causing signal CSIN on chip select lead 41 to go high. That then turns off the signal DTACKO. Note that the processor access is synchronized to the two bus clocks MCLK and SCLK (both having frequencies of 2.56 MHz, see FIG. 12). Note also that for several locations, it is simply the act of doing a write access which causes the desired effect in bus interface 20. In this case, no data values are actually written.

Figure 13:
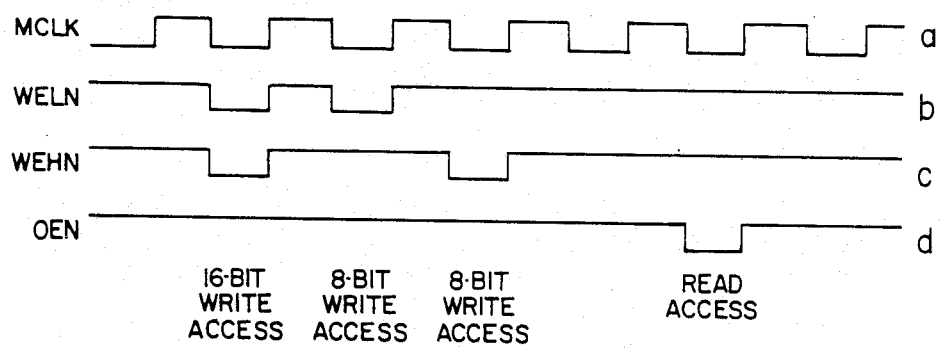

Accesses to buffer memory 26 are handled for both processor 22 and bus 21 by circuitry in processor interface 42. The write enable (WELN, WEHN) and output enable (OEN) signals which control the RAM memory in buffer memory 26 have timing as shown in FIG. 13. All accesses for bus 21 data will be in word mode (i.e. 16 bits at a time); consequently, both signals WEHN and WELN will be active (i.e. low) when writing data to buffer memory 26. That will also be the case if processor 22 makes a word mode access to buffer memory 26. If processor 22 writes only one byte (i.e. 8 bits) to buffer memory 26 then either WEHN or WELN will be active, but not both (see FIG. 13).

Data multiplexer 43 controls the data that processor 22 reads from buffer memory 26 or another location in bus interface 20. Address bits 15 and 14 on address bus 68 (derived from bus 37) select which of the four sources of data will be passed through the multiplexer 43. Control signals on control bus 44 from processor interface 42 are also used in controlling data multiplexer 43.

Address multiplexer 46 is used to apply the proper address to buffer memory 26. Multiplexer 46 is used to select one of the three sources of addresses to be applied to buffer memory 26. The three addresses are either ADRI on address bus 37, signals TXADR on bus 47, or the signals RXADR on bus 48.

Write data multiplexer 49 is used to apply the proper data to data bus 27 which communicates with buffer memory 26. Multiplexer 49 is used to select one of the three sources of data to be applied to buffer memory 26. The three data sources are data (on bus 38) from microprocessor 22, data (on receive data bus 36), and data (on bus 35) referred to as BYTECNT.

Buffer management circuit 51 contains circuitry which manages or controls buffer memory 26. In a preferred embodiment of bus interface 20, buffer memory 26 is comprised of eight individual storage buffers 29a to 29h referred to collectively as storage buffers 29, each containing 2K bytes of RAM memory. Because of the word mode nature of the interface each 2K by 8 buffer space is arranged in memory 26 as 1K by 16. The details of the operation of buffer management circuit 51 will be discussed in more detail later.

Transmit state machine 52 contains transmit control circuitry and a pipeline. When processor 22 has filled a transmit buffer 29 in buffer memory 26 with a packet, it must write a value equal to the number of bytes in the packet into byte count latch 93, in state machine 52. Bus interface 20 can then be primed to transmit that packet by writing the appropriate value of the signals TXPTR0, TXPTR1, TXRDY.

The circuitry in transmit state machine 52 makes requests for access to buffer memory 26, handles access grants (to buffer memory 26), and controls transmission of data to another module (not shown) connected to bus 21 in response to flow control signals (RRDYI) from that other module (via control buses 25 and 25a).

Receive state machine 53 contains receive control circuitry and a pipeline. When control circuit 101 of state machine 53 recognizes the bus interface's address at the beginning of a packet, the RACKO and RRDYO signals are generated and sent, to the module on bus 21 which is sending the packet, to acknowledge that the packet is being received. The put pointer in Buffer Management Circuit 51 will increment to select a new receive buffer after the current packet is completed. The bytes will be stored as words (i.e. sixteen bits) in the buffer as they are received. Counter 102 keeps track of how many bytes have been received.

State machine 53 makes requests for access to buffer memory 26, handles access grants (to buffer memory 26), and responds to flow control signals (e.g. XDVI: transmit data valid) from the transmitting module on bus 21, via control buses 30 and 30a. Receive state machine 53 also contains the receive data pipeline 103. The function of pipeline 103 will be described in more detail later.

Cyclic Redundancy Check (CRC) circuit 56 contains circuitry which calculates and stores the CRC value. If and only if processor 22 reads or writes any location in buffer memory 26 and circuit 56 is not disabled by a control signal (not shown), the data is passed through this circuitry and the resulting sixteen bit value is stored in register 104. Processor 22 can also read register 104 or write a new value directly into it.

Tap control circuit 57 contains the reset circuitry and the bus interface identification circuitry. It also depicts how the various information and status bits within the bus interface are grouped together to be read by the processor.

Although all data accesses from transmit state machine 52 and receive state machine 53 into buffer memory 26 are done in word mode (i.e. sixteen bits), processor 22 can access data from buffer memory 26 in either word mode (i.e. sixteen bits) or byte mode (i.e. eight bits). Also, the access by processor 22 to any other location in bus interface 20 can be in word or byte mode. Thus, bus interface 20 can be interfaced to both eight bit and sixteen bit microprocessors.

Figure 6:
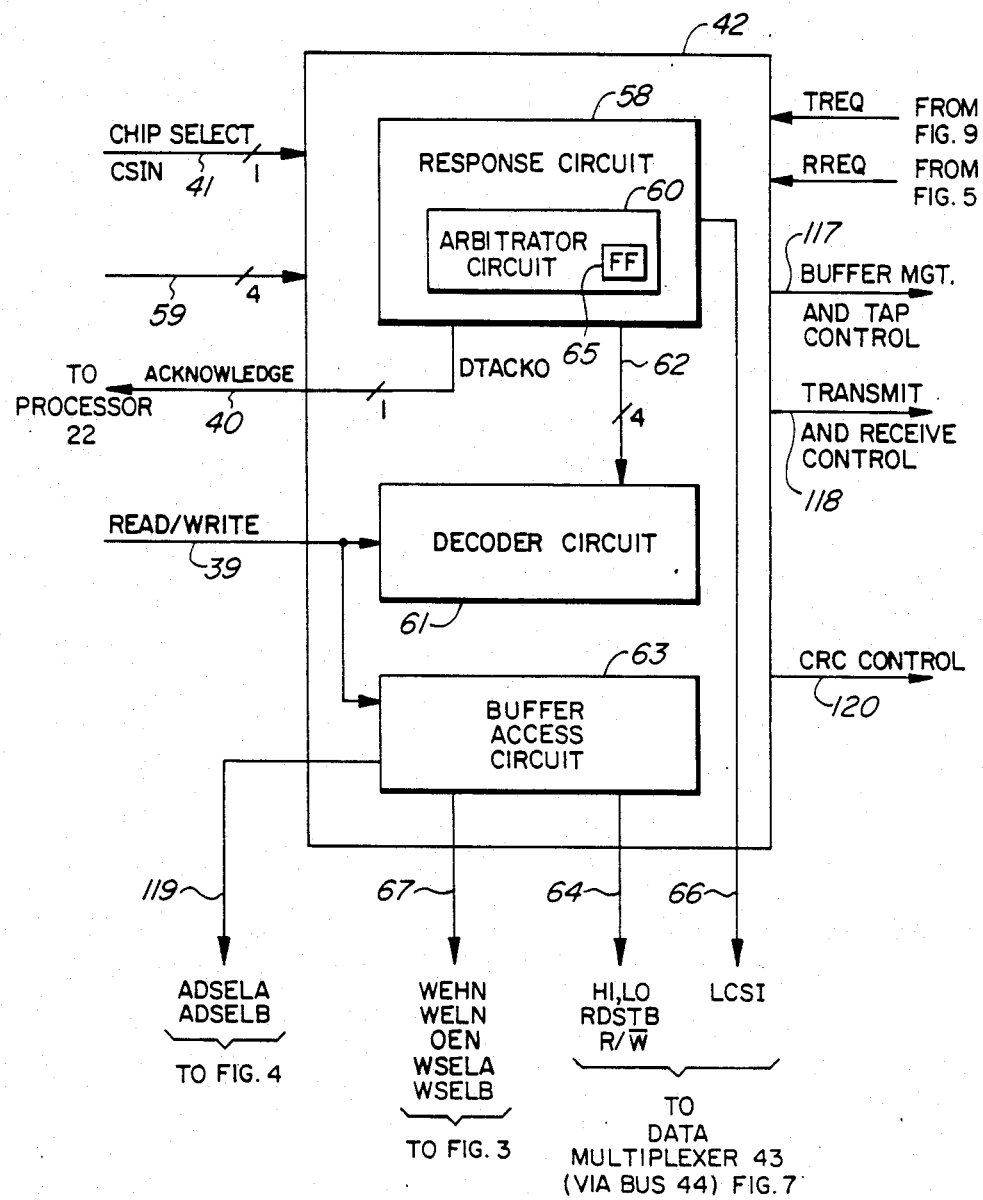
FIG. 6 is a simplified block diagram of the processor interface of FIG. 2.

FIG. 6 depicts processor interface 42 which contains the control circuitry for processor 22 accesses into bus interface 20. Response circuit 58 contains circuitry which generates responses to the access. The signal CSIN on chip select line 41 goes low when processor 22 addresses the area in the processor's address space where all the bus interface address locations are located (in this case, HEX address 37XXXX, where X represents any hexadecimal digit). Address bits 15 and 14 on bus 59 are decoded to indicate which major area of bus interface 20 is being accessed, and address bits 13 and 12 (also on bus 59) indicate which specific location is being accessed. Examples of the bus interface address locations are: HEX 370000 to 373FFF for buffer memory 26; HEX 374000 for status word; and HEX 37DOOO for CRC register write.

When the access has been completed the signal DTACKO, on acknowledge line 40, is asserted by going high and is returned to processor 22. Processor 22 then ends the access causing signal CSIN on chip select lead 41 to go high. That then turns off signal DTACKO (i.e. it returns to a low state). Notice that the processor access is synchronized to the two bus clocks MCLK and SCLK depicted in FIG. 12.

Decoder circuit 61 decodes write accesses to all the bus interface locations except buffer memory 26. Note that for several locations, it is simply the act of doing a write access which causes the desired effect in bus interface 20. No data values are actually written in those cases. Note that the information on bus 62, interconnecting response circuit 58 and decoder circuit 61, comprises address bits 12 and 13 originating from address bus 59, along with their complements.

Buffer access circuit 63 handles accesses to buffer memory 26 (FIG. 1) for processor 22, data output bus 31, and data input bus 34. Write enable (WELN, WEHN) signals which control multiplexer 49 are generated by buffer access circuit 63. All accesses for data from input bus 34 will be in word mode; consequently, both signals WEHN and WELN will be active (i.e. low) when writing data into buffer memory 26. That will also be the case if processor 22 makes a word mode access to buffer memory 26. If processor 22 writes only one byte to buffer memory 26 then either WEHN or WELN will be active, but not both since WELN activates one byte of memory 26 for write, and WEHN activates the other (i.e. two bytes constitute one word). The least significant address bit (i.e. bit 0 from processor 22) is decoded by buffer access circuit 63 to indicate whether the access is to the upper byte or the lower byte of the word. Access is indicated by signals WELN, WEHN, or OEN from buffer access circuit 63.

It should also be noted that interface 42 contains an arbitrator circuit 60. The heart of arbitrator circuit 60 is a flip-flop 65 whose state indicates whether processor 22 (FIG. 1) or the transmit and receive bus 21 has access to buffer memory 26.

First consider the case in which bus interface 20 is not performing a loopback. Note that loopback is a procedure for testing bus interface 20 by causing it to transmit a packet on bus 21 for reception by itself (i.e. the packet carries, as the destination address, the address of the originating interface). Doing loopback requires that processor 22 primes bus interface 20 for loopback (access a location) and places the bus interface's own bus address in the first byte of the transmitted packet so that its own receiver will recognize it.

The arbitrator flip-flop 65 is normally in the state which gives access to transmit state machine 52 or receive state machine 53, whichever may be active and requesting access to memory 26. When processor 22 addresses a location which bus interface 20 recognizes as being in buffer memory 26, the input circuitry to arbitrator 60 will normally cause flip-flop 65 to change state, giving access to processor 22. The logic will only allow flip-flop 65 to stay in this state for one cycle of clock MCLK before causing access to be returned to transmit and receive state machines 52 and 53, respectively. During this one clock cycle for processor 22 access, the transmit and receive state machines 52 and 53, respectively will use the data pipeline (receive or transmit) to keep up with the bus data rate.

The other case which arbitrator 60 handles is when bus interface 20 has been placed in loopback mode. When a loopback packet is being sent and received, both the transmit and receive circuitry (i.e. state machines 52 and 53) need access to buffer memory 26. This does not allow time for processor 22 accesses into buffer memory 26. Processor 22 is therefore locked out of buffer memory 26 after it places bus interface 20 into loopback mode. Arbitrator 60, in loopback mode, arbitrates between transmit state machine 52 and receive state machine 53. This is accomplished by gating requests from transmit state machine 52 to make arbitrator 60 respond as if they were processor 22 requests. Arbitrator 60 can then grant access to the two sets of transmit and receive circuitry alternately, by functioning just as it does when not in loopback mode.

Figure 7:
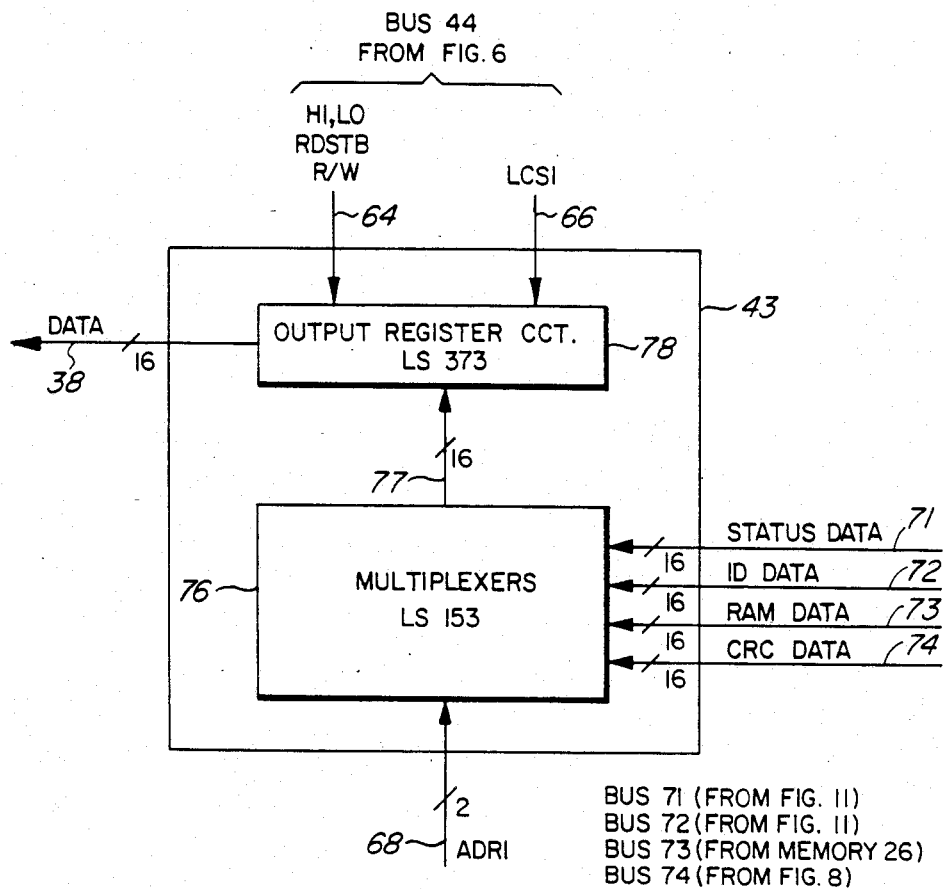
FIG. 7 is a simplified block diagram of the data multiplexers of FIG. 2.

FIG. 7 depicts the data path when processor 22 reads data from buffer memory 26 or from another location in bus interface 20. Address bits 15 and 14 on bus 68 select which one of the four sources of data will be passed through multiplexer 43. The four sources of data are depicted in FIG. 7. They are status data on bus 71, ID data on bus 72, RAM data on bus 73 and CRC data on bus 74. Actual multiplexing in data multiplexer 43 is accomplished by multiplexer circuit 76. The output of multiplexer 76 is carried on bus 77 to output register circuit 78. The high and low bytes of output register circuit 78 are activated by signals, on bus 44, from processor interface 42 of FIG. 6. These signals are referred to as HI, LO, RDSTB, R/W, and LCSI. The multiplexed data is output from output register circuit 78 on data bus 38.

Figure 4:
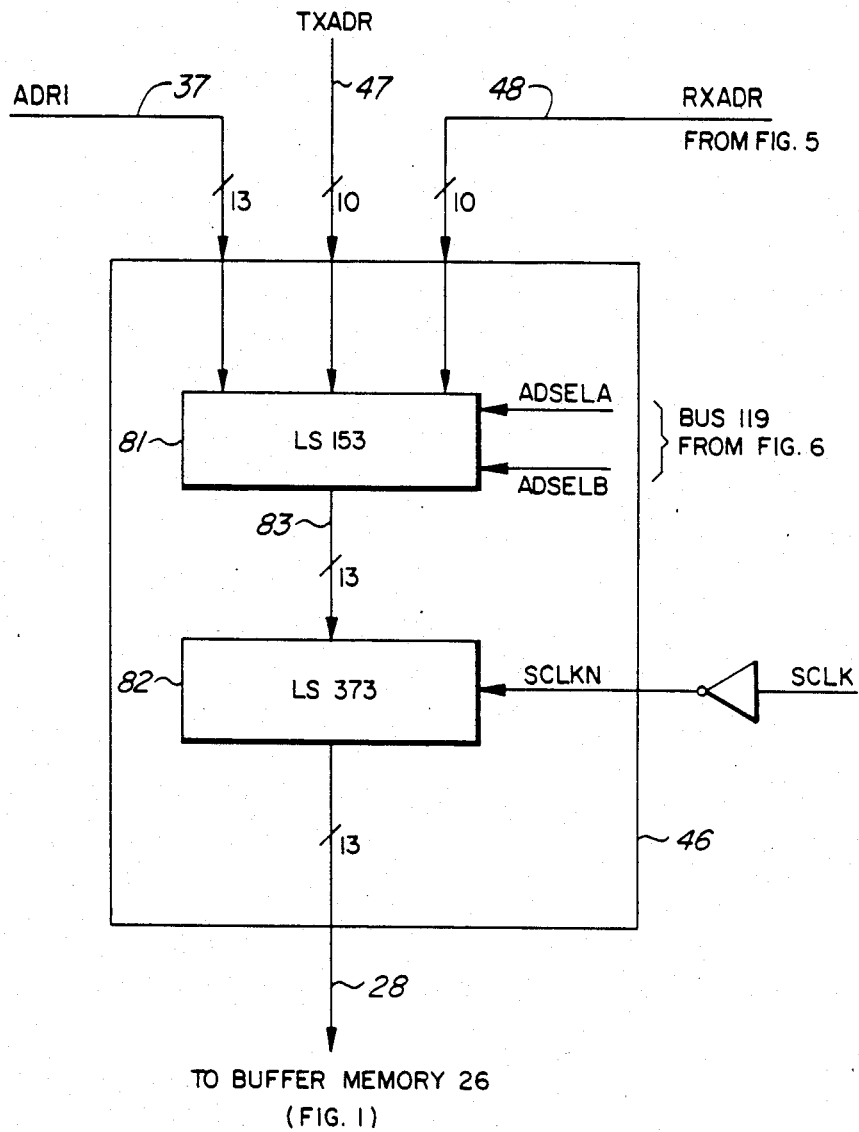
FIG. 4 is a simplified block diagram of the RAM address multiplexer of FIG. 2.

FIG. 4 depicts address multiplexer 46 which selects one of the three addresses applied to it and applies the selected address to buffer memory 26. One of three sources of an address is selected by multiplexer circuit 81, part of address multiplexer 46. The selected address is latched into register circuit 82 via bus 83. The three addresses which may be selected are address ADRI (from processor 22) on address bus 37, TXADR (from transmit state machine 52) on bus 47 and address RXADR (from receive state machine 53) on address bus 48. The chosen address is then output from register circuit 82 on bus 28. The selection is made by signals ADSELA and ADSELB.

Figure 3:
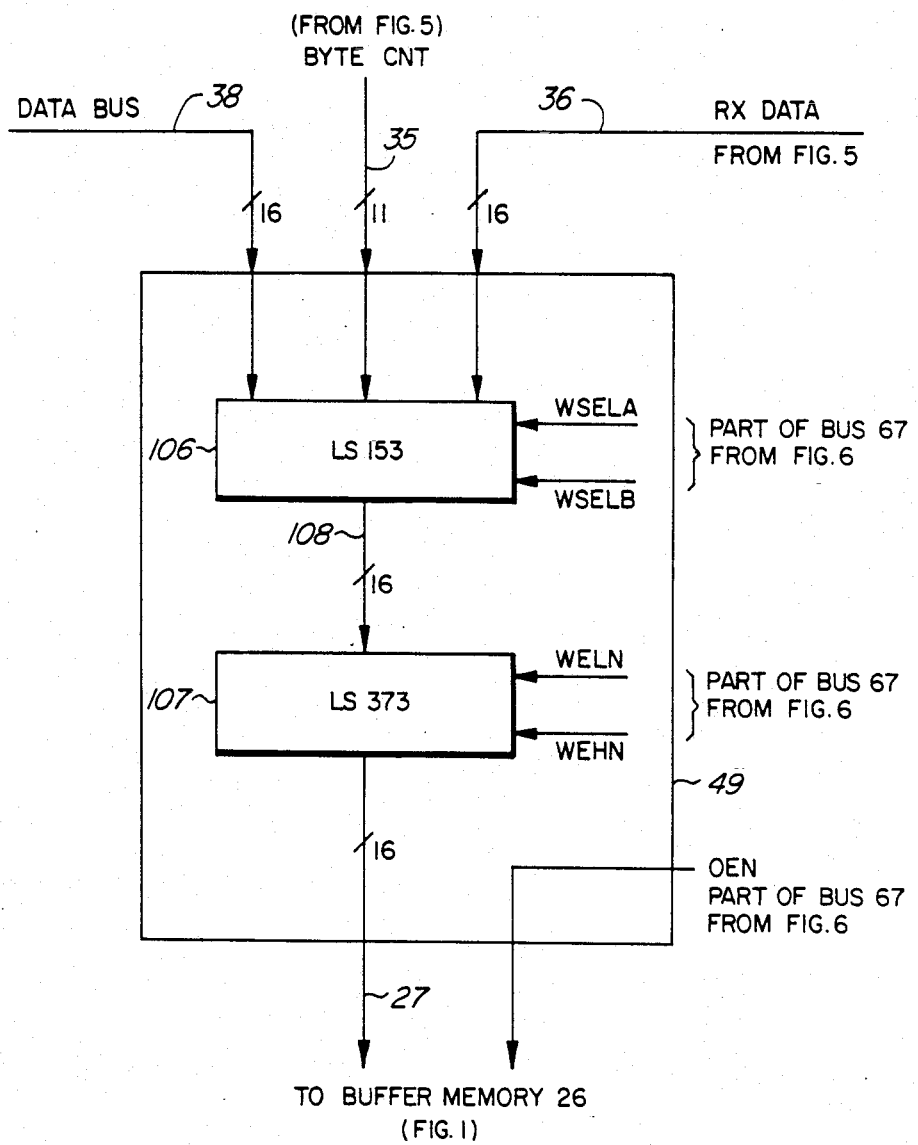
FIG. 3 is a simplified block diagram of the RAM write data multiplexer of FIG. 2.

FIG. 3 depicts write data multiplexer 49 which selects one of the three data sources applied to it and applies the selected data source to bus 27, and consequently to buffer memory 26. One of the three sources of an address is selected by multiplexer circuit 106, part of data multiplexer 49. The selected data is latched into register circuit 107 via bus 108. The three sources of data which may be selected are data on bus 38 (from processor 22), data on bus 36 (from receive state machine 53), and data on bus 35 also referred to as BYTECNT.

Figure 10:
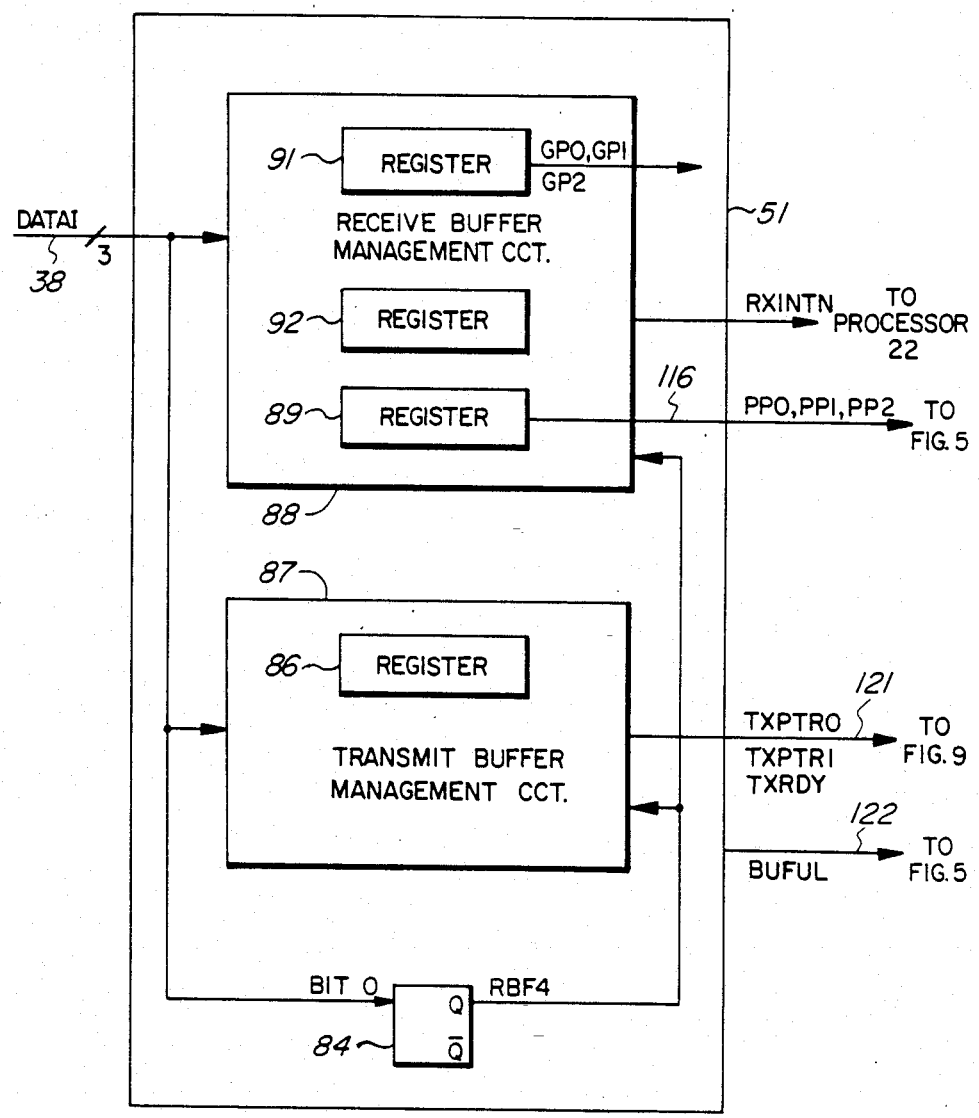
FIG. 10 is a simplified block diagram of the buffer management circuit of FIG. 2.

FIG. 10 depicts buffer management circuit 51 containing the circuitry which manages buffer memory 26. In the preferred embodiment of bus interface 20, buffer memory 26 is comprised of eight storage buffers 29a to 29h, each buffer containing 2K bytes of RAM memory. Because of the word mode nature of the interface, each 2K by 8 buffer space is arranged in memory 26 as 1K by 16.

Processor 22 (FIG. 1) can set a bit value (referred to as RBF4) in flip-flop 84 which controls how storage buffers 29 in buffer memory 26 are allocated for transmit and receive. If bit RBF4 equals 0 then there are six receive buffers 29 and two transmit buffers 29 in buffer memory 26. If RBF4 equals 1, then there are four receive buffers 29 and four transmit buffers 29 in buffer memory 26. Note that there is only one packet stored in each 2K buffer 29, even though a packet will not normally fill an entire buffer. Note that each packet may range anywhere from two bytes to 2046 bytes, in length.

Processor 22 can control which of the two or four transmit buffers 29 should be used by transmit state machine 52 for data transmission by writing a three bit value into register 86 of transmit buffer management circuit 87. The three bit value input into register 86 consists of the bits 8, 9 and 10 of data bus 38. The output of register 86 consists of the three signals TXPTR0, TXPTR1, and TXRDY. TXRDY is the bit which actually primes the bus interface 20 for transmission of data.

Receive buffer management circuit 88 controls how the receive state machine 53 fills the four or six receive buffers 29 in buffer memory 26 with incoming packets of data from bus 34. The "put pointer" contained in register 89 is a three bit pointer which has a value which points to the address of the receive buffer 29 in buffer memory 26 which is the next to be filled or is currently being filled. The output bits of the put pointer are denoted PP0, PP1, and PP2. The put pointer value is changed by receive state machine 53 each time it finishes receiving a new packet.

The "get pointer" is also a three bit pointer, contained in register 91. The get pointer has a value which points to the address of the next receive buffer 29 in buffer memory 26 which will be emptied by processor 22. The bits of the get pointer register 91 are denoted GP0, GP1, and GP2. The get pointer value can be set by processor 22 to any three bit number via bus 38. Note that the signals GP0, GP1 and GP2 are used internally of the buffer management circuit 51. Note that the put pointer and the get pointer can also be referred to as status bits.

The put pointer increments as receive buffers 29 in buffer memory 26 are filled with packets and it eventually reaches the address of the highest available receive buffer 29 (either the fourth or sixth one, depending upon the state of bit RBF4). The next time it changes it will point to the lowest receive buffer 29. This means that bus interface 20 uses the receive buffers 29 in buffer memory 26 as a circular queue. Bus interface 20 can receive a number of packets without any intervention by processor 22. As a put pointer increments around the circular queue, if the get pointer value is not changed by processor 22, the put pointer will eventually catch up to the get pointer. When the value of the put pointer equals the value of the get pointer then all the receive buffers 29 are full. Buffer management circuit 51 provides a signal (BUFUL) on lead 122 to receive state machine 53 when this is true so that no further packets will be received.

Register 92 contains another three bit pointer called the "interrupt pointer" which operates in conjunction with the put pointer of register 89 to generate the receive interrupt (RXINTN) to processor 22. If the put pointer and the interrupt pointer are not equal, the receive interrupt is active (i.e. high). Processor 22 can acknowledge the reception of each packet by incrementing the interrupt pointer by accessing a location (no data required) one count at a time until the interrupt pointer and the put pointer are equal, thereby clearing the receive interrupt. The interrupt pointer increments in circular fashion as does the put pointer by doing a write access to the proper address (which is CLRXINT at HEX FXXX). Note that the interrupt pointer can also be referred to as status bits.

Figure 9:
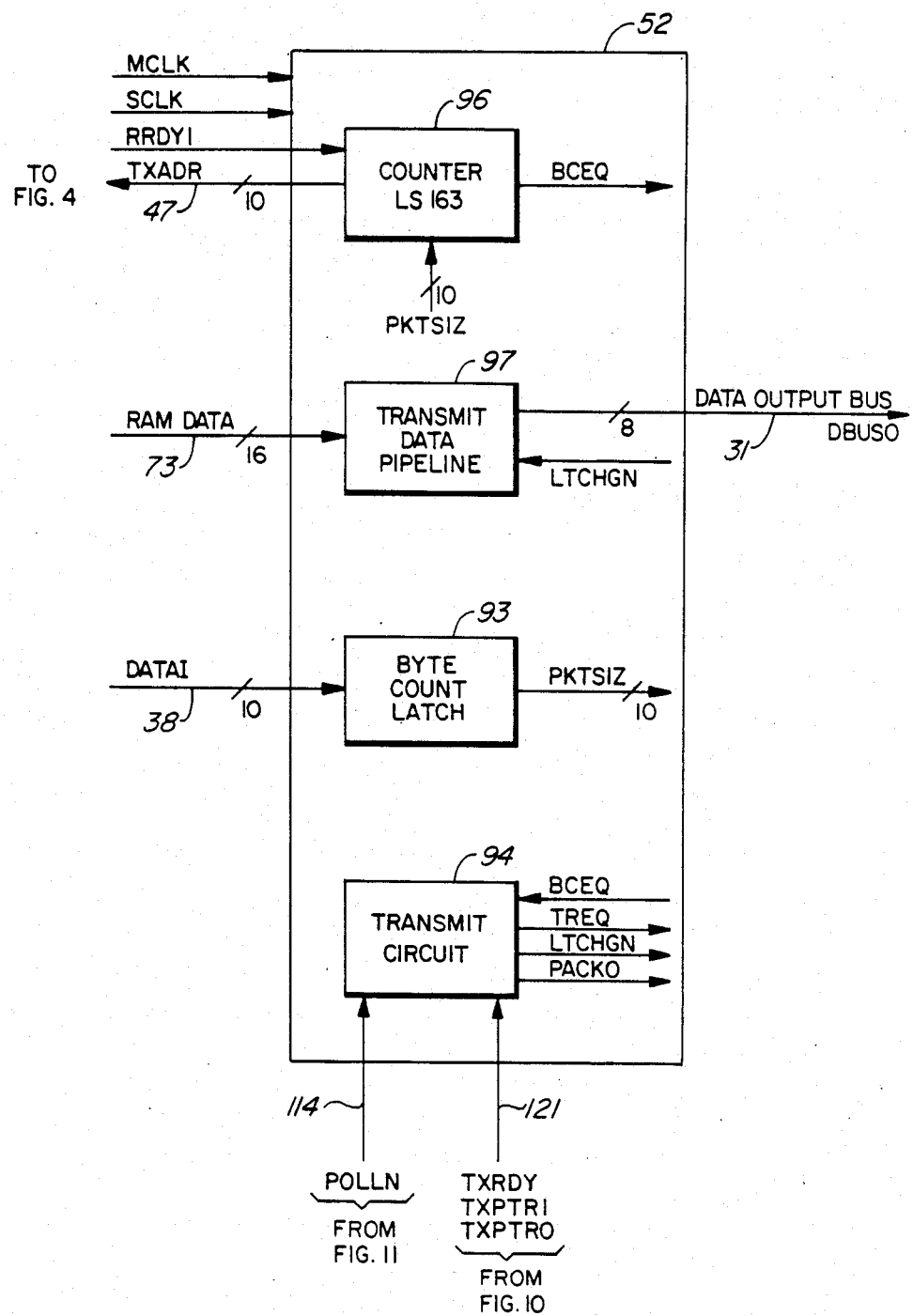
FIG. 9 is a simplified block diagram of the transmit state machines of FIG. 2.

FIG. 9 depicts transmit state machine 52 in more detail. When processor 22 has filled a transmit buffer 29 in buffer memory 26 with a packet, it must write a value equal to the number of bytes in the packet into byte count latch 93. The value is applied to latch 93 via data bus 38. Bus interface 20 can then be primed to transmit that packet by writing the appropriate value of the signals TXPTR0, TXPTR1, and TXRDY.

Signal TXRDY is the actual signal which triggers the process of transmission. Signals TXPTR0 and TXPTR1 select which one of the buffers 29 contains the packet to be sent by providing the two most significant address bit values when transmit state machine 52 reads data from buffers 29.

Transmit circuit 94, of transmit state machine 52, will then seek access to output bus 31 in the normal way. Thus it will respond to a poll on polling bus 32, indicated by signal POLLN on lead 114 being active, by asserting the signal PACKO and then waiting for the DBSYO signal to become inactive, indicating that data output bus 31 is available. Circuit 94 will then generate signals that assert the signal DBSYO on bus 21, causing data to be sent via bus 31, and then releasing data output bus 31 when either the packet is completed or the RACKO signal from bus 21 indicates that the packet cannot be sent.

When initiating a transmission, interface 20 places the packet destination address on data bus 31, negates signal PACKO to allow polling to resume, and assets XDVI (transmit data valid) to indicate that the destination address on bus 31 is valid. Further transmission is delayed until the destination returns signals RACKO and RRDYI.

As the data words are read from buffer memory 26, counter 96, part of transmit state machine 52, keeps track of how many bytes have been sent. When the count (i.e. output of counter 96, signal BCEQ) equals the value in the byte count latch 93 and the last byte has been successfully sent without flow control, the DBSYO signal will be released signalling the end of the packet. An interrupt signal is sent to processor 22 to indicate, to processor 22, the end of the transmission.

Transmit circuit 94 makes requests for access to buffer memory 26, handles access grants to memory 26, and responds to flow control signals from the receiving module of another bus interface also connected to bus 21 by operating in a bytewise state machine fashion described in Table I, following. Note that the bytes are numbered by their addresses in buffer memory 26. Bytes stored at addresses 000, 002, 004, etc., are referred to as even bytes and bytes stored at addresses 001, 003, 005, etc., are referred to as odd bytes.

TABLE I

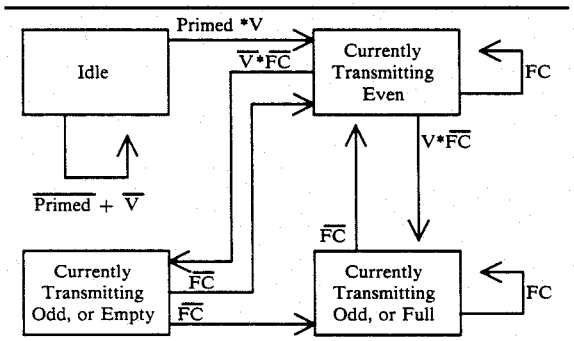

| Symbol | Significance |
|---|---|
| Idle | Beginning state. After being primed and getting RAM access, first transition occurs. |
| Currently Transmitting Even | Even numbered byte currently on bus. Request is made for access. |

TABLE I-continued

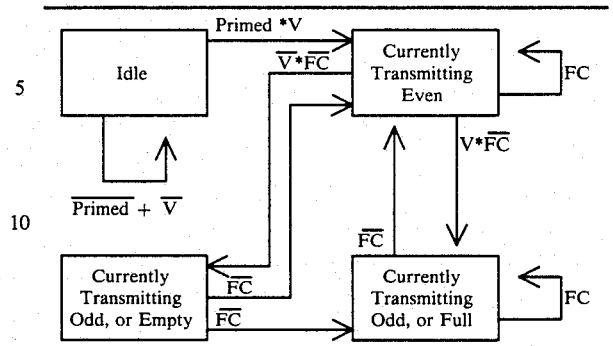

| Symbol | Significance |
|---|---|
| Currently Transmitting Odd, or Empty | Odd numbered byte currently on bus. Pipeline is empty because prior request for access denied. Request continues and will be granted. |
| Currently Transmitting Odd, or Full | Odd numbered byte currently on bus. Pipeline is full because prior request for access granted. No request for access is made. |
| V/$\overline{V}$ | Signifies access request granted/not granted. |
| FC/$\overline{FC}$ | Signifies flow control received/not received. |
| * | And |
| + | Or |

Transmit data pipeline 97 will now be described. When an even numbered byte is currently on output bus 31, there is always one more byte in pipeline 97 because transmit state machine 52 always reads data from buffer memory 26 one word (i.e. two bytes) at a time. Thus, the request for access is active at this time (i.e. signal TREQ; transmit request). If the access is not granted, then in the following clock cycle when the other (i.e. odd numbered) byte is transmitted, the pipeline will be empty. Request for access continues to be active (i.e. asserted), however, and an access is assured. In the new data word which will be read at this time, one byte will immediately be transmitted in the next clock cycle and the other byte will be stored in pipeline 97. Note that pipeline 97 comprises two latches connected in series and can store two bytes in series.

If, when an even numbered byte is currently on data output bus 31, the request for access is granted, then when the odd numbered byte is transmitted in the next time slot, pipeline 97 will have two bytes stored in it.

Thus, the arrangement of word mode accesses to buffer memory 26 and data pipeline 97 of transmit state machine 52 allows transmit state machine 52 to always send data at the maximum rate (i.e. one byte during every cycle of the 2.56 MHz clock). Note that if flow control signals (i.e. RRDYI not asserted) are received during a packet, it does not adversely affect the transmission sequence, but rather provides more "breathing room".

Figure 5:
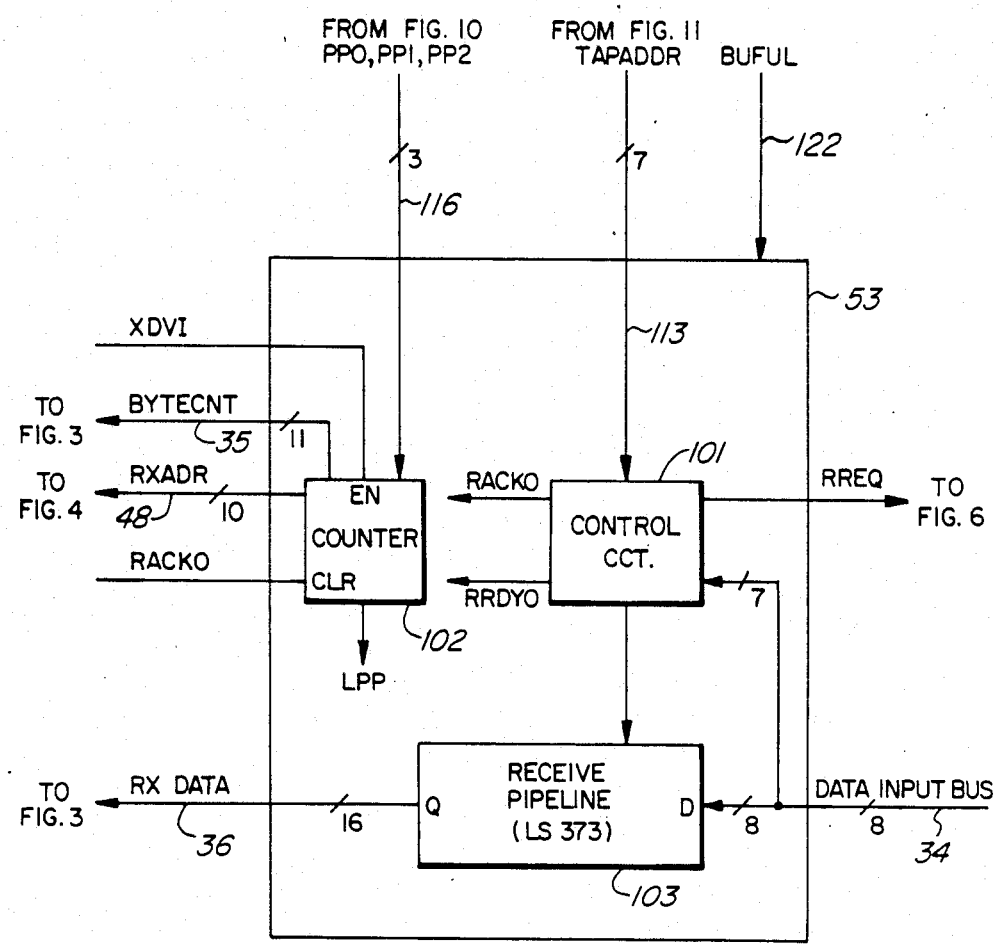
FIG. 5 is a simplified block diagram of the receive state machines of FIG. 2.

Receive state machine 53 of FIG. 5 will now be described. When control circuit 101 recognizes the bus interface's address at the beginning of a packet, the signals RACKO and RRDYO are generated and sent to the receiving module of another bus interface also connected to bus 21 which is sending the packet to acknowledge that the packet is being received. The "put pointer" (i.e. signals PP0, PP1 and PP2 from FIG. 10) already has a value which points to a new receive buffer 29 in buffer memory 26. The receive data bytes will be stored as words (i.e. sixteen bits) in the buffer 29 as they are received. Counter 102 keeps track of how many bytes have been received and outputs its count on bus 35 at the end of the packet at the last word of the particular buffer involved.

Note that the signal RACKO (Receiver Acknowledge) is generated when interface 20 recognizes that its address matches the first byte (or destination address) of a packet on data input bus 34. If interface 20 can receive a packet, it will respond by asserting signal RACKO (on bus 30). If interface 20 is unable to receive a packet because all buffers are full, is reset, or is not connected to bus 21, it will not assert signal RACKO.

Signal RRDYO (Receiver Ready) is asserted (on bus 30) by interface 20 when receiving a packet on bus 34 to indicate that it is ready to accept the current byte on data bus 34. Since interface 20 can always keep up with the bus data rate, signal RRDYO will always be asserted once interface 20 begins to receive a packet.

When the packet ends, any bytes left over in receive pipeline 103 are stored away at the next location in buffer memory 26. Then the byte count BYTECNT (from counter 102) is stored away as a data word at the highest location in the particular buffer 29a through 29h. Processor 22 can then read the length of the packet from the highest location in buffer memory 26 (via bus 27) and empty the correct number of bytes from buffer memory 26 when required.

Control circuit 101 makes requests for access to buffer memory 26, handles access grants to memory 26, and responds to flow control signals (i.e. XDVI not asserted) from the transmitting module of another bus interface also connected to bus 21 by operating in a bytewise state machine fashion as shown in Table II, following.

TABLE II

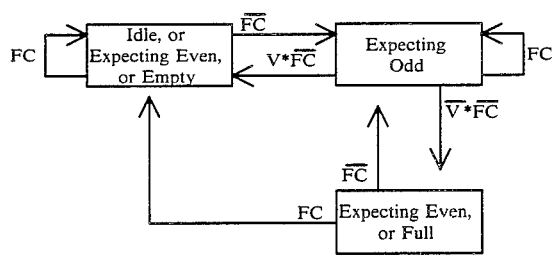

| Symbol | Significance |
| --- | --- |
| Idle, or Expecting Even, or Empty | Beginning state. State also entered whenever pipeline is emptied and even numbered byte expected from bus. |
| Expecting Odd | Even numbered byte has been received and odd numbered byte expected from bus. |
| Expecting Even, or Full | State entered when odd numbered byte has been received, even numbered byte expected from bus, and prior request for access denied. Request continues and will be granted. |
| V/$\overline{V}$ | Signifies access request granted/not granted. |
| FC/$\overline{FC}$ | Signifes flow control received/not received. |
| * | And |

The operation of receive pipeline 103 will now be described in somewhat more detail (note: pipeline 103 can store two bytes). When an even numbered byte has been received from data input bus 34 and an odd numbered byte is expected, a request for access will be made. This request for access is made of arbitrator 60 by receive state machine 53 via signal RREQ. If arbitrator 60 does not grant the request, then the odd numbered byte will be stored in pipeline 103 and the request for access will continue into the next clock cycle. The request is certain to be granted at that time and pipeline 103 will be emptied of two bytes at that time while a third byte is put into pipeline 103. Note that if the request was not granted, it was because access was given to processor 22. Since processor 22 is not allowed two accesses in a row, the next access is sure to be available for receive state machine 53, if it is active.

If, when an even numbered byte has been received and an odd numbered byte is expected, the request is granted, then both bytes will be stored in buffer memory 26 and pipeline 103 will be totally empty.

The arrangement of word mode access between buffer memory 26 and receive pipeline 103 allows receive state machine 53 to always receive data from data input bus 34 at the maximum rate (i.e. one byte every cycle of the 2.56 MHz clock). Note that if flow control signals (i.e. XDVI not asserted) are received during a packet, they do not adversely affect the reception sequence, but rather provide more "breathing room".

Figure 11:
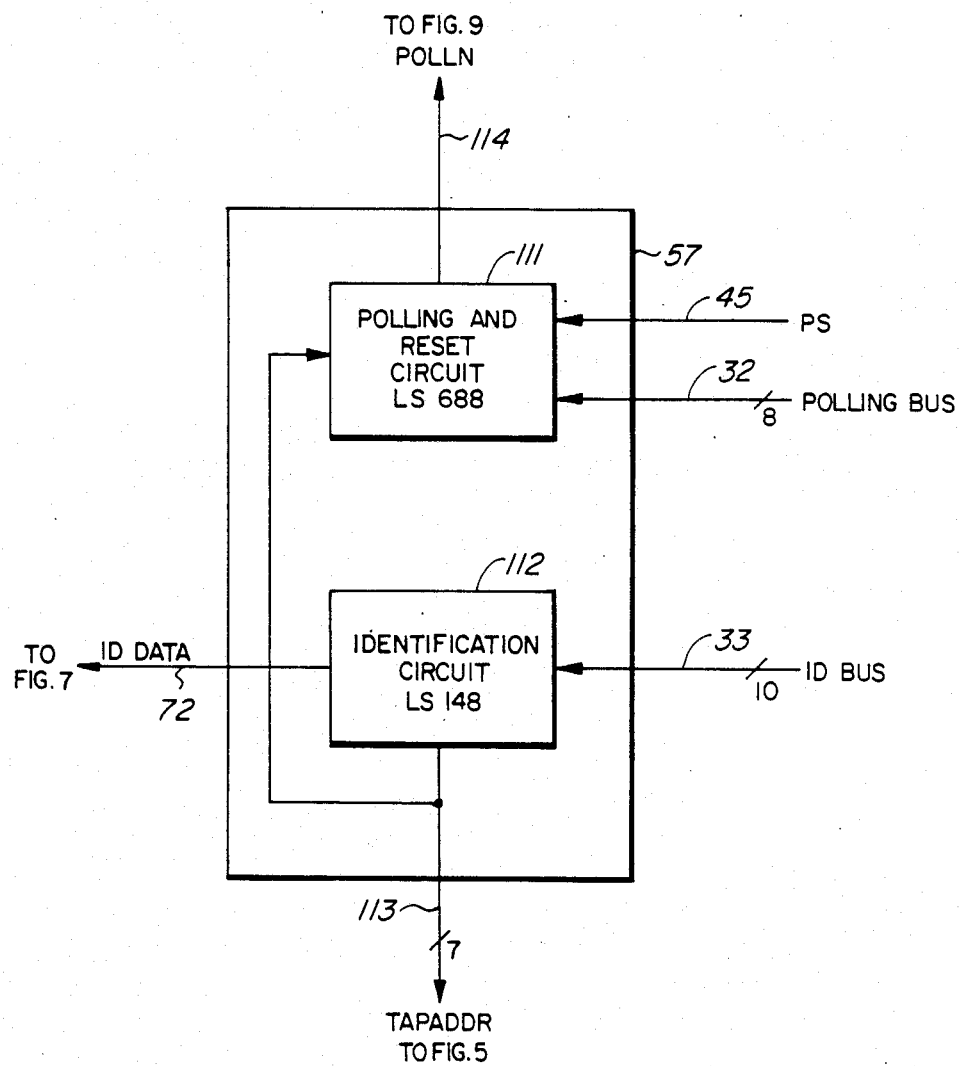
FIG. 11 is a simplified block diagram of the tap control circuit of FIG. 2.

FIG. 11 depicts polling and reset circuit 111 and identification circuit 112 of tap control circuit 57.

If, during a given cycle of the 2.56 MHz clock (MCLK), the poll strobe (PS) signal on lead 45 (originating with the bus 21 controller, not shown) is asserted on bus 21, then the value on polling bus 32 is indicative of either a poll or a reset. The two are distinguished by the state of the most significant bit (i.e. bit 7) of polling bus 32. If bit 7 is at a high level (i.e. logic 1), it denotes a poll, while a low level (i.e. logic 0) denotes a reset. The remaining seven bits (0 to 6) on polling bus 32 contain the address for the particular bus interface 20, connected to bus 21, being polled.

Polling is used to query the various interfaces 20 connected to bus 21 to see if they want access to bus 21. Reset is used to initialize or to re-initialize an interface 20 if a problem should occur.

Note also that polling bus 32 is a parallel bus having eight leads, and arranged to have 320 timeslots, or channels, per frame (each frame is 125 microseconds).

The poll strobe (PS) signal on lead 45 occurs on even timeslots (of polling bus 32) and its maximum occurrence is on every other even timeslot (i.e. 80 times per frame). When signal PS is active, an address of a bus interface 20 is on polling bus 32.

When a poll is recognized by bus interface 20 and interface 20 has been primed to transmit by virtue of processor 22 having set signal TXRDY, an acknowledge signal, PACKO is generated and sent (via lead 25) to the bus 21 controller (not shown) both to inhibit further polling and to alert the bus controller (not shown) that interface 20 wants to send a packet of data. Additionally, signal POLLN on lead 114 is made active.

The signal PACKO remains asserted on lead 25 until interface 20 actually becomes the active user of data bus 31. This is due to the fact that polling occurs while the current user is still using data bus 31. In this manner, the next user is identified and in standby mode, waiting for the current user to finish.

When the current user finishes, interface 20 (assuming it has asserted signal PACKO) has 6.24 microseconds (or 16 timeslots of bus 32) in which to assert signal DBSYO (data bus busy output) and to release signal PACKO. Releasing signal PACKO allows polling for a subsequent user to re-start while bus interface 20 is using data bus 31. The bus 21 controller (not shown) will reset a device failing to meet this requirement (i.e. asserting DBSYO and releasing PACKO).

When interface 20 receives a reset, it deactivates all of its bus drivers. After a reset, interface 20 must stay in the reset mode until it is polled again.

Figure 8:
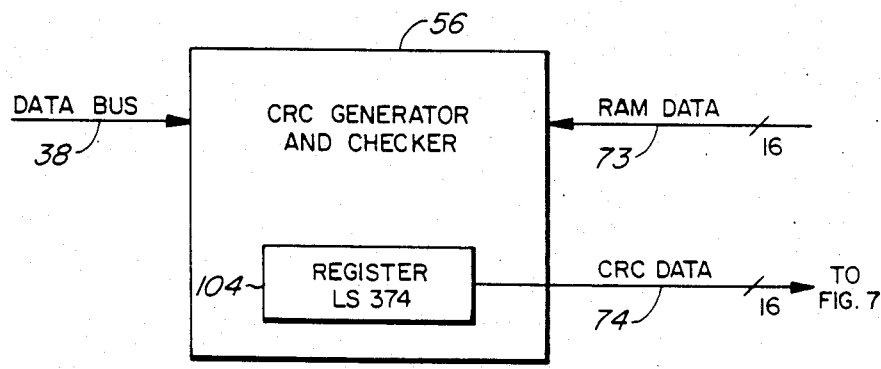
FIG. 8 depicts the CRC generator and checker of FIG. 2.

FIG. 8 depicts CRC (cyclic redundancy check) generator and checker 56. If and only if processor 22 reads or writes any location in buffer memory 26 (with CRC generator 56 enabled), the data is passed through circuit 56 along with the prior value stored in register 104 and resulting sixteen bit value is stored in register 104. Processor 22 can also read register 104 or write a new value directly into register 104.

When processor 22 has a packet to send, it can use CRC circuit 56 to calculate the CRC value. Processor 22 first writes zero directly into the CRC register 104 via bus 38. It then loads the packet into buffer 29. Note that processor 22 can load the packet one byte at a time or one word (i.e. two bytes) at a time and the CRC circuit 56 will accumulate the value on one byte or two bytes, as appropriate. After the packet has been loaded, processor 22 reads the CRC register 104 and writes the value into buffer memory 26 at the end of the packet, completing the packet. The value in register 104 should then be zero.

Conversely, when a packet has been received, processor 22 can first set the register 104 directly to zero, unload the entire packet including the CRC value at the end, and verify that the CRC register is once again zero.

What is claimed is:

1. An interface circuit for interfacing between a shared bus and a processor, both for extracting information, in the form of packets, from said bus and for transmitting information, in the form of packets, to said bus, said interface circuit comprising:
   interface control means for receiving control information from said shared bus and transmitting control information to said shared bus in order to regulate accesses of said interface circuit to said shared bus independently of said processor;
   receiver means, responsive to control signals from said interface control means, for receiving data from said shared bus and for routing said data to a temporary data storage means;
   transmitter means, responsive to control signals from said interface control means, for transmitting data from said temporary data storage means to said shared bus; and
   access control means both for controlling the flow of data between said processor and said temporary data storage means and for regulating access to said storage means between said processor and said interface circuit.

2. The interface circuit of claim 1 wherein said access control means and said interface control means interact such that the processor has access to said storage means no more frequently than every other possible access to said storage means.

3. The interface circuit of claim 1 wherein a data multiplexer is used to select data from either said receiver means or said processor for writing to said storage means.

4. The interface circuit of claim 1 wherein said receiver means contains a data pipeline for storing, temporarily, the data received from said shared bus.

5. The interface circuit of claim 4 wherein said data pipeline is a serial device having the capacity to store two bytes of data, in series, at one time.

6. The interface circuit of claim 1 further including a cyclic redundancy check (CRC) circuit for selectively performing error checks on data received from either said processor or said storage means.

7. The interface circuit of claim 1 wherein said transmitter means contains a data pipeline for storing, temporarily, the data read from the storage means prior to transmission to the bus.

8. The interface circuit of claim 7 wherein said data pipeline is a device having the capacity to store two bytes of data, in series, at one time.

9. An interface circuit for interfacing between a shared bus and a processor both for extracting data, in the form of packets, from said bus and for transmitting data, in the form of packets, to said bus, said interface circuit comprising:
   interface control means for exchanging control data with said shared bus, in the form of identification signals, polling signals, and control signals in order to regulate accesses of said interface circuit to said shared bus both for the reception of data on said bus, addressed to said interface circuit, and for the transmission of data on said shared bus independently of said processor;
   receiver means, responsive to control signals from said interface control means, for receiving data from said shared bus and for routing said data to a data storage means for temporary storage;
   transmitter means, responsive to control signals from said interface control means, for accessing data stored in said storage means and transmitting it to said shared bus;
   access control means both for controlling the flow of data between said processor and said data storage means, and for regulating access to said data storage means between said processor and said interface circuit.

10. The interface circuit of claim 9 wherein status bits are employed both to control the writing of data into said data storage means and to control the reading of data from said data storage means.

11. The interface circuit of claim 9 wherein accesses to said data storage means, for either reading or writing, are made n bits at a time, or whole multiples of n, wherein n is a positive integer greater than one.

12. The interface circuit of claim 11 wherein n equals eight and wherein only one multiple of n is used, namely sixteen.

13. An interface circuit, for interfacing between a shared bus and a processor, for exchanging data in the form of packets between said bus and said processor, said interface circuit comprising:
   interface control means for exchanging control data with said shared bus in order to regulate accesses of said interface circuit to said shared bus;
   a state machine means, including a data pipeline, said state machine means responsive to control signals from said interface control means, for exchanging data between said shared bus and a data storage means;
   access control means both for controlling the flow of data between said processor and said data storage means, and for regulating access to said data storage means between said processor and said state machine means;
   wherein access to said data storage means alternates between said state machine means and said processor such that said data pipeline in said state machine means accommodates data being exchanged between said data storage means and said shared bus during those times that said processor is accessing said data storage means.

14. The interface circuit of claim 13 wherein said state machine means includes both a receiver means and a transmitter means and includes two data pipelines, one for transmit and one for receive.

15. The interface circuit of claim 14 wherein said access control means regulates access to said data storage means such that said processor is given no more than one access in a row.

16. The interface circuit of claim 15 wherein each said data pipeline contains storage sufficient to hold data for two accesses to said shared bus.

17. The interface circuit of claim 16 wherein each data pipeline stores two bytes of data.

18. The interface circuit of claim 15 wherein said interface control means responds to polling signals from said shared bus to indicate that said interface circuit requests or does not request access to said shared bus.

19. The interface circuit of claim 13 wherein said state machine is a receive means and includes one data pipeline such that the exchange of data is from said bus only.

20. The interface circuit of claim 13 wherein said state machine is a transmitter means and includes one data pipeline such that the exchange of data is to the bus only.

* * * * *